US011880977B2

(12) United States Patent
Price et al.

(10) Patent No.: US 11,880,977 B2
(45) Date of Patent: Jan. 23, 2024

(54) INTERACTIVE IMAGE MATTING USING NEURAL NETWORKS

(71) Applicant: Adobe Inc., San Jose, CA (US)

(72) Inventors: Brian Lynn Price, Pleasant Grove, UT (US); Scott Cohen, Sunnyvale, CA (US); Marco Forte, Bray (IE); Ning Xu, Milpitas, CA (US)

(73) Assignee: Adobe Inc., San Jose, CA (US)

( * ) Notice: Subject to any disclaimer, the term of this patent is extended or adjusted under 35 U.S.C. 154(b) by 258 days.

(21) Appl. No.: 17/313,158

(22) Filed: May 6, 2021

(65) Prior Publication Data

US 2021/0256708 A1  Aug. 19, 2021

Related U.S. Application Data

(63) Continuation of application No. 16/365,213, filed on Mar. 26, 2019, now Pat. No. 11,004,208.

(51) Int. Cl.
*G06T 7/11* (2017.01)
*G06T 7/136* (2017.01)
(Continued)

(52) U.S. Cl.
CPC ............. *G06T 7/11* (2017.01); *G06N 3/045* (2023.01); *G06N 3/088* (2013.01); *G06T 3/40* (2013.01);
(Continued)

(58) Field of Classification Search
None
See application file for complete search history.

(56) References Cited

U.S. PATENT DOCUMENTS

| 8,175,384 B1 | 5/2012 | Wang |
| 9,881,207 B1 | 1/2018 | Nguyen et al. |
| 2017/0213112 A1 | 7/2017 | Sachs et al. |

OTHER PUBLICATIONS

H. Xiao, J. Feng, Y. Wei, M. Zhang and S. Yan, "Deep Salient Object Detection With Dense Connections and Distraction Diagnosis," in IEEE Transactions on Multimedia, vol. 20, No. 12, pp. 3239-3251, Dec. 2018, doi: 10.1109/TMM.2018.2830098. (Year: 2018).*

(Continued)

*Primary Examiner* — Emily C Terrell
*Assistant Examiner* — Nathan J Bloom
(74) *Attorney, Agent, or Firm* — FINCH & MALONEY PLLC

(57) ABSTRACT

Techniques are disclosed for deep neural network (DNN) based interactive image matting. A methodology implementing the techniques according to an embodiment includes generating, by the DNN, an alpha matte associated with an image, based on user-specified foreground region locations in the image. The method further includes applying a first DNN subnetwork to the image, the first subnetwork trained to generate a binary mask based on the user input, the binary mask designating pixels of the image as background or foreground. The method further includes applying a second DNN subnetwork to the generated binary mask, the second subnetwork trained to generate a trimap based on the user input, the trimap designating pixels of the image as background, foreground, or uncertain status. The method further includes applying a third DNN subnetwork to the generated trimap, the third subnetwork trained to generate the alpha matte based on the user input.

19 Claims, 12 Drawing Sheets

(51) Int. Cl.
| | |
|---|---|
| G06T 7/194 | (2017.01) |
| G06T 7/90 | (2017.01) |
| G06T 3/40 | (2006.01) |
| G06N 3/088 | (2023.01) |
| G06N 3/045 | (2023.01) |
| G06N 3/02 | (2006.01) |
| G06N 20/00 | (2019.01) |

(52) U.S. Cl.
CPC .............. *G06T 7/136* (2017.01); *G06T 7/194* (2017.01); *G06T 7/90* (2017.01); *G06N 3/02* (2013.01); *G06N 20/00* (2019.01); *G06T 2207/10024* (2013.01); *G06T 2207/20081* (2013.01); *G06T 2207/20084* (2013.01); *G06T 2207/20096* (2013.01); *G06T 2207/20104* (2013.01)

(56) References Cited

OTHER PUBLICATIONS

Bielski A, Favaro P. Emergence of object segmentation in perturbed generative models. Advances in Neural Information Processing Systems. May 2019 (Year: 2019).*

Everingham et al., "The PASCAL Visual Object Classes Challenge 2012 (VOC2012) Results", retreived from http://www.pascalnetwork.org/challenges/VOC/voc2012/workshop/index.html, URL: 10 pages.

Zhao et al., "Pyramid Scene Parsing Network", arXiv:1612.01105v2, Apr. 27, 2019, 11 pages.

Juan 0., Keriven R. (2005) Trimap Segmentation for Fast and User-Friendly Alpha Matting. In: Paragios N., Faugeras O., Chan T., Schnorr C. (eds) Variational, Geometric, and Level Set Methods in Computer Vision. VLSM 2005. Lecture Notes in Computer Science, vol. 3752. Springer, Berlin, Heidelberg (Year: 2005).

Li, Ping, Tingyan Duan, and Yongfeng Cao. "Image matting with normalized weight and semi-supervised learning." arXiv preprint arXiv:1710.10101 (Oct. 2017) (Year: 2017).

Shen X., Tao X., Gao H., Zhou C., Jia J. (Oct. 2016) Deep Automatic Portrait Matting. In: Leibe B., Matas J., Sebe N., Welling M. ( eds) Computer Vision—ECCV 2016. Lecture Notes in Computer Science, vol. 9905. Springer, Cham (Year: 2016).

Yao GL. A survey on pre-processing in image matting. Journal of Computer Science and Technology 32(1): 122-138 Jan. 2017. DOI 10.1007/s11390-017-1709-z (Year: 2017).

Xu N, Price B, Cohen S, Huang T. Deep image matting. InComputerVision and Pattern Recognition (CVPR) Mar. 10, 2017. (Year: 2017).

Y. Zheng and C. Kambhamettu, "Learning based digital matting," 2009 IEEE 12th International Conference on Computer Vision, Kyoto, 2009, pp. 889-896. doi: 10.1109/ICCV.2009.5459326 (Year: 2009).

Kim J, Han D, Tai YW, Kim J. Salient region detection via high-dimensional color transform and local spatial support. IEEE transactions on image processing. Jan. 2016;25(1):9-23. (Year: 2016).

Levin, Anat, Dani Lischinski, and Yair Weiss. "A closed-form solution to natural image matting." IEEE Transactions on Pattern Analysis and Machine Intelligence 30.2 (2008): 228-242. (Year: 2008).

E. Shahrian and D. Rajan, "Weighted color and texture sample selection for image matting," 2012 IEEE Conference on Computer Vision and Pattern Recognition, Providence, RI; 2012, pp. 718-725. doi: 10.1109/CVPR.2012.6247741 (Year: 2012).

Cho D., Tai YW., Kweon I. (2016) Natural Image Matting Using Deep Convolutional Neural Networks. In: Leibe B., Matas J., Sebe N., Welling M. (eds) Computer Vision—ECCV 2016. ECCV 2016. Lecture Notes in Computer Science, vol. 9906 (Year: 2016).

Jue Wang and Michael F. Cohen (2008), "Image and Video Matting: A Survey", Foundations and Trends® in Computer Graphics and Vision: vol. 3: No. 2, pp. 97-175. http:l/dx.doi.org/10.1561/0600000019 (Year: 2008).

Shan Shen, W. Sandham, M. Granat and A. Sterr, "MRI fuzzy segmentation of brain tissue using neighborhood attraction with neural-network optimization," in IEEE Transactions on Information Technology in Biomedicine, vol. 9, No. 3, pp. 459-467, Sep. 2005. doi: 10.1109/TITB.2005.847500 (Year: 2005).

Long, Jonathan, Evan Shelhamer, and Trevor Darrell. "Fully convolutional networks for semantic segmentation." Proceedings of the IEEE conference on computer vision and pattern recognition. 2015. (Year: 2015).

* cited by examiner

Input Image
110

Composition
Using
Alpha
Matte
500

User Input
(FG/BG marking)
105

Input Image
110

Mouse Clicks
610

Input Image
110

Mouse Swipe and Clicks
620

INTERACTIVE IMAGE MATTING USING NEURAL NETWORKS

CROSS-REFERENCE TO RELATED APPLICATION

This application is a continuation of U.S. patent application Ser. No. 16/365,213 (filed 26 Mar. 2019), the entire disclosure of which is hereby incorporated by reference herein.

FIELD OF THE DISCLOSURE

This disclosure relates to image processing. Particularly, this disclosure relates to techniques for neural network based interactive image matting.

BACKGROUND

Selection and masking of an object in an image, a process that is also referred to as image matting, is a common and important task in many photographic workflows. For instance, it is often desirable to be able to select and extract a person or object from the foreground of an image and then place that selection against a new background and/or perform other image processing tasks on the selection. Unfortunately, existing photo manipulation tools are tedious to use and require significant skill to select objects from images, and yet these tools can still produce inaccurate or otherwise unsatisfactory results. This is particularly true when the background image is complex and the borders of the selected objects include fine details like hair or fur, which can be a common occurrence since many photos have people and animals as their subjects.

DETAILED DESCRIPTION

Figure 1:
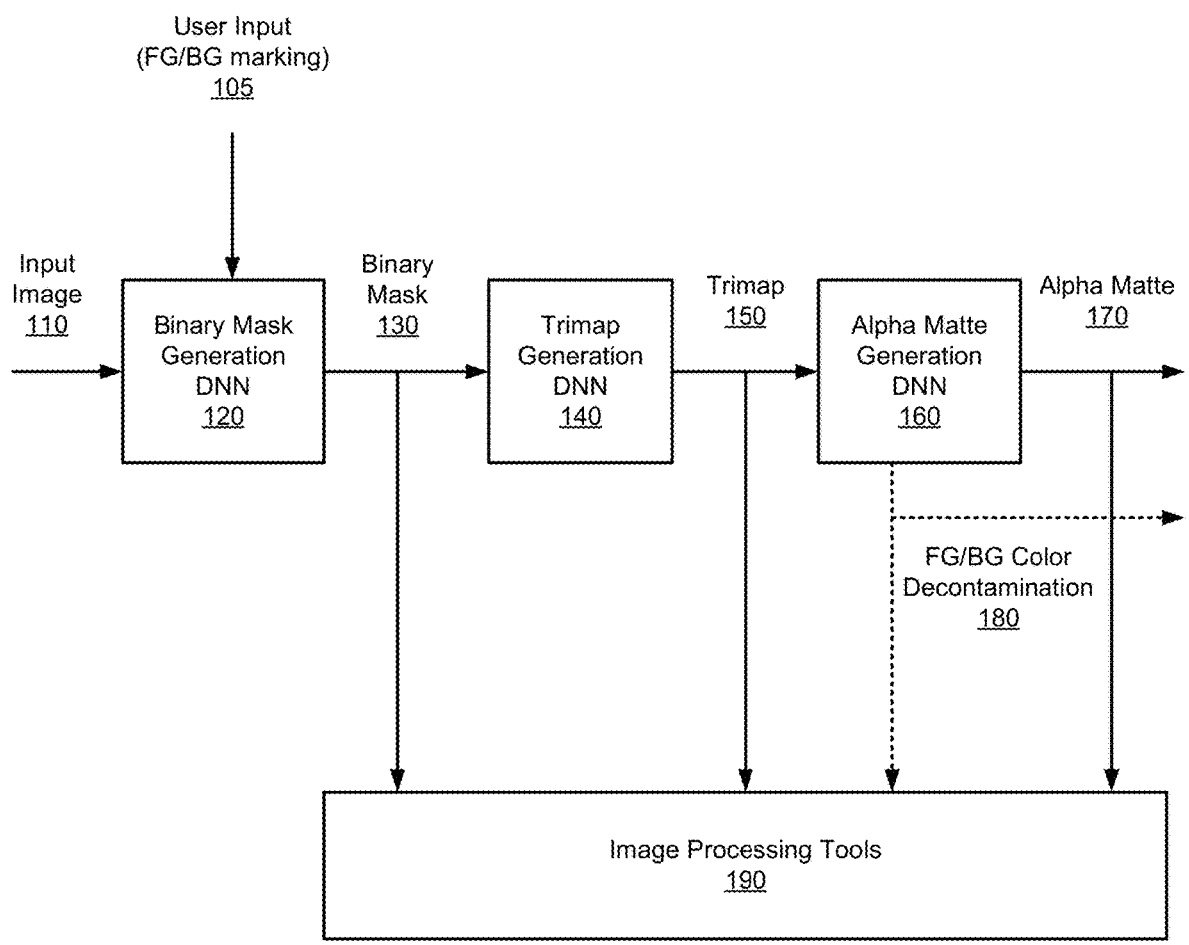
FIG. 1 is a top-level block diagram of an image matting system, configured in accordance with an embodiment of the present disclosure.

As noted previously, image matting is an important task in photographic workflows. Unfortunately, existing photo manipulation tools require significant skill to perform these matting tasks and are quite time consuming. Furthermore, these techniques are often ineffective as they can produce inaccurate or otherwise unsatisfactory results, particularly when the background image is complex and the borders of the selected objects include fine details like hair or fur. In more detail, the image matting problem, for example the desire to obtain a high-quality mask of an object, is made more difficult by the fact that it is not sufficient to simply label each pixel in the image as either foreground or background. This is because the color of many pixels involve a combination of colors from both the foreground and the background. This occurs particularly at the edges of objects, where the light that is received by a camera sensor element arrives from both the object and the background behind the object. This commonly occurs for objects like hair and fur, and for semi-transparent objects, as well as for blurry objects.

To this end, it would be desirable to have an interactive image matting system that is capable of generating an accurate mask (also referred to as an alpha matte) of a selected object based on just a few (for example, one to three) user provided selection indicators such as mouse clicks or a swipe gesture over the object of interest. Additionally, it would be desirable for such a system to operate efficiently on larger and relatively high resolution images. Thus, the present disclosure provides a deep neural network (DNN)-based system and methodology for generating an accurate alpha matte from a given image with improved computational efficiency. In some embodiments, the alpha matte comprises pixels which correspond to the pixels of the input image but which provide an indication of the percentage of the foreground object for each of the image pixels.

According to one example such embodiment, an alpha matte is generated for an input image, by a DNN-based methodology, based on one or more user-specified foreground region locations in the image. In more detail, the method for generating the alpha matte includes applying a first subnetwork of a DNN to the input image. The first subnetwork is trained to generate a binary mask associated with the image based on the user-specified foreground region locations. The binary mask designates pixels of the image as background or foreground. The method also includes applying a second subnetwork of the DNN to the generated binary mask. The second subnetwork is trained to generate a trimap associated with the image based on the binary mask and the user-specified foreground region locations. The trimap designates the pixels of the image as either background, foreground, or uncertain status. The method further includes applying a third subnetwork of the DNN to the generated trimap. The third subnetwork is trained to generate the alpha matte based on the trimap and the user-specified foreground region locations. The use of a trimap results in improved matting performance compared to systems that go directly from a binary mask to an alpha matte. In some embodiments, the three subnetworks may be combined and trained as a single end-to-end network. Additionally, techniques are disclosed, according to an embodiment, to improve computational efficiency when dealing with large and/or high-resolution images, as will be explained in greater detail below. In yet still further embodiments, techniques are disclosed for decontamination of foreground and background colors to minimize or prevent halo effects when compositing a selected mask object into a new background.

Thus, the foregoing framework provides a DNN-based tool for generation of an alpha matte for use in image matting and other photo manipulation applications. The intermediate components, binary mask and trimap, may also be made available or otherwise provided to the user as an end product or as input to other photo processing tools. The disclosed techniques provide an efficient method for generating the alpha matte from a relatively few user inputs with improved accuracy through the use of an intermediate trimap between the binary mask and the alpha matte. These techniques offer significant advantages over existing methods that require extensive technical skill and manipulation of the image, and yet often fail to produce acceptable results. Numerous configurations and variations will be apparent in light of this disclosure.

System Architecture

FIG. 1 is a top-level block diagram of an image matting system 100, configured in accordance with an embodiment of the present disclosure. As can be seen, the image matting system 100 includes a binary mask generation DNN subnetwork 120 configured to generate a binary mask 130 from an input image 110, based on user input foreground/background markings 105. The system further includes a trimap generation DNN subnetwork 140 configured to generate a trimap 150 from the binary mask 130. The system further includes an alpha matte generation DNN subnetwork 160, configured to generate an alpha matte 170 from the trimap 150. In some embodiments, the alpha matte generation DNN subnetwork 160 may also be configured to generate foreground/background (FG/BG) color decontamination maps 180. The operation of these DNN subnetworks and the nature of the user input will be described in greater detail below. The results at each processing stage (for example, binary mask 130, trimap 150, alpha matte 170, and FG/BG color decontamination maps 180) may be provided as useful end products unto themselves, however they may also be provided to image processing tools 190 as a starting point for further photographic manipulation and processing. For example, the alpha matte 170 may be used to facilitate image recompositing, wherein the selected foreground object is placed over a new background.

Figure 2:
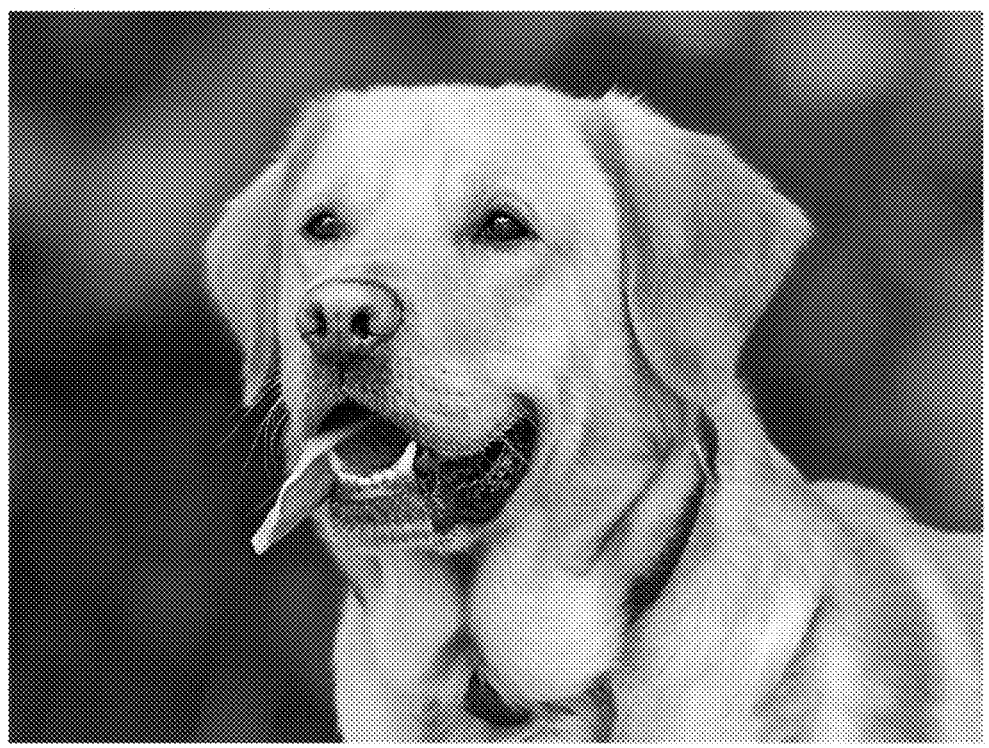
FIG. 2 illustrates conversion of an input image to a binary mask, in accordance with an embodiment of the present disclosure.
Figure 2:
Figure 2:

FIG. 2 illustrates conversion of an input image 110 to a binary mask 130, in accordance with an embodiment of the present disclosure. The input image 110 shows a dog against an out of focus background. The binary mask 130 shows the computed background region 210 and foreground region 220. In some embodiments, the foreground region pixels may be represented or labeled by a first value, for example 255, and the background region pixels may be represented or labeled by a second value, for example, zero. In some further embodiments, some pixels of the generated binary mask, along the edge between the foreground and the background, may take on intermediate values between the foreground value and the background value, however this is distinct from the configuration of the trimap as described below. As can be seen, the binary mask 130 does not capture the fine details at the border between background and foreground regions, and thus any processing based on the binary mask alone can produce unrealistic images.

Figure 3:
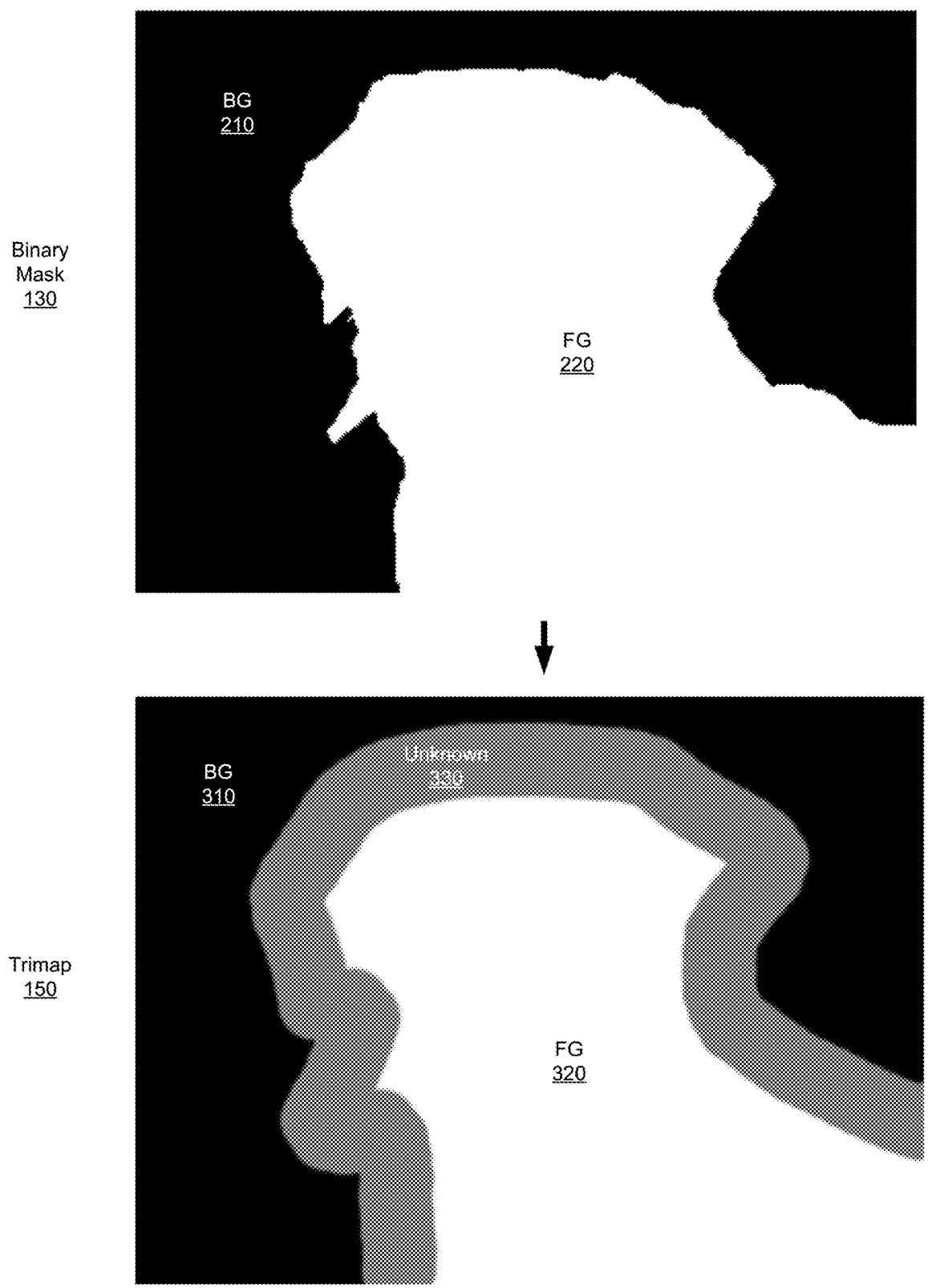
FIG. 3 illustrates conversion of a binary mask to a trimap, in accordance with an embodiment of the present disclosure.

FIG. 3 illustrates conversion of a binary mask 130 to a trimap 150, in accordance with an embodiment of the present disclosure. The trimap 150 comprises a new background 310 and foreground 320 along with a region designated to be of uncertain status 330 between the background and foreground. The uncertain status region 330 allows for more accurate generation of the alpha matte, as will be described in greater detail below. In some embodiments, the uncertain status region 330 may comprise a range of values rather than a single value. This would appear as a number of shades of grey for the uncertain status region instead of a single shade, as shown in the simpler illustrated example of FIG. 3.

Figure 4:
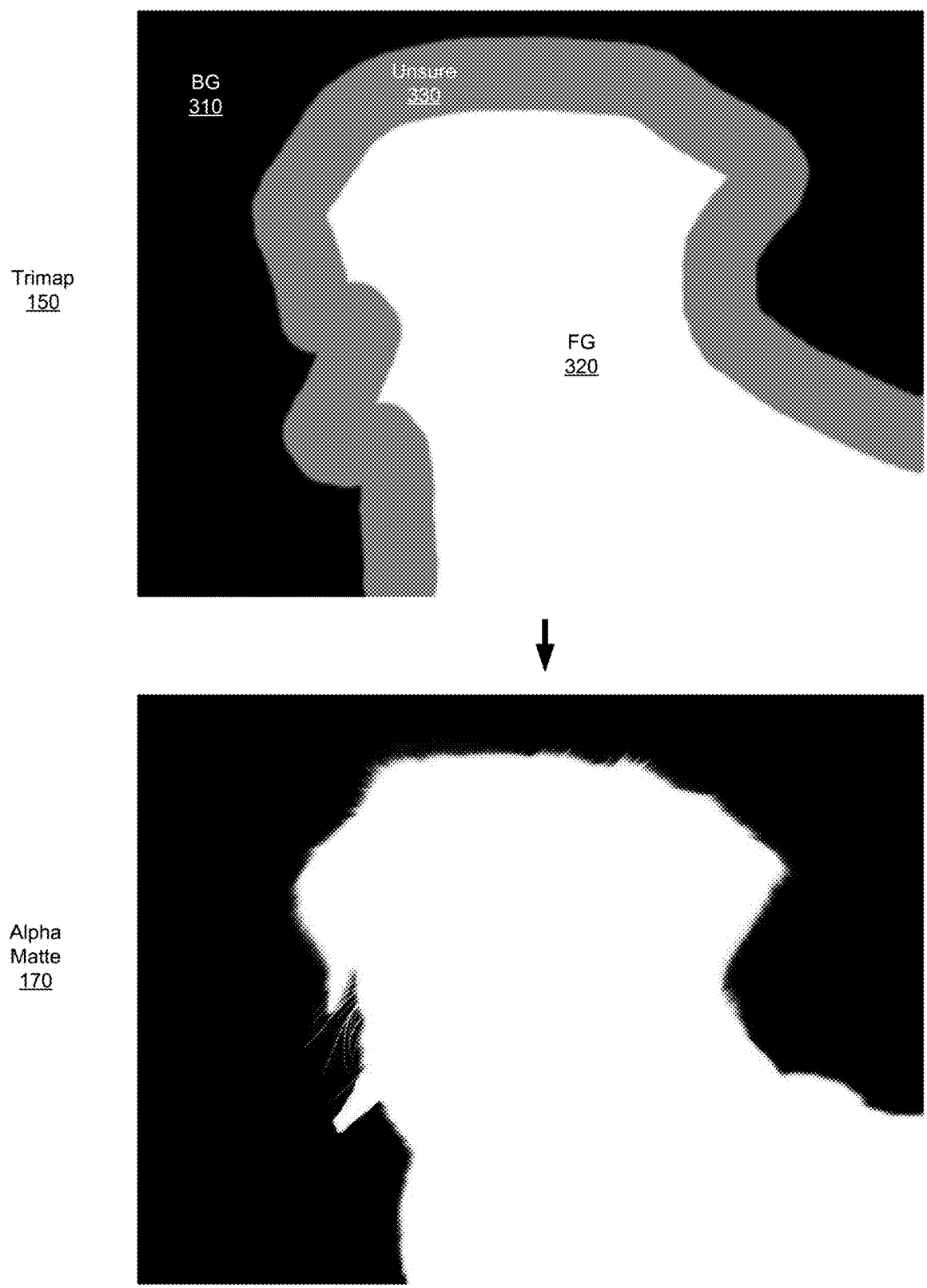
FIG. 4 illustrates conversion of a trimap to an alpha matte, in accordance with an embodiment of the present disclosure.
Figure 5:
FIG. 5 illustrates an image composition using an alpha matte, in accordance with an embodiment of the present disclosure.
Figure 5:
Figure 5:

FIG. 4 illustrates conversion of a trimap 150 to an alpha matte 170, in accordance with an embodiment of the present disclosure. As can be seen, the resulting alpha matte 170 includes the fine details of the fur and whiskers of the dog, which should allow for significantly improved results from downstream image processing. For example, FIG. 5 illustrates an image composition 500 using the alpha matte 170, in accordance with an embodiment of the present disclosure. The dog in the foreground is placed against a new background with a realistic composition.

Figure 6:
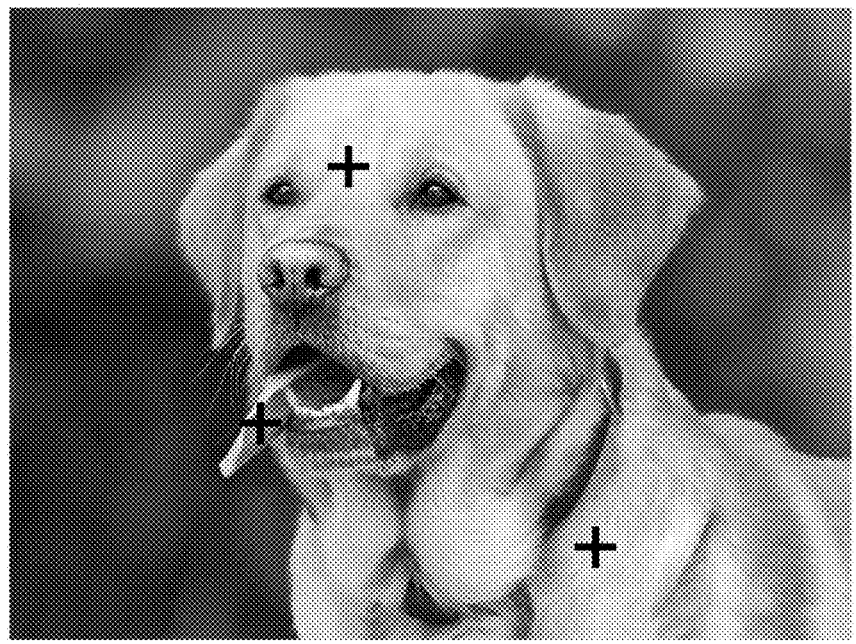
FIG. 6 illustrates user input for foreground/background marking of an image, in accordance with an embodiment of the present disclosure.
Figure 6:
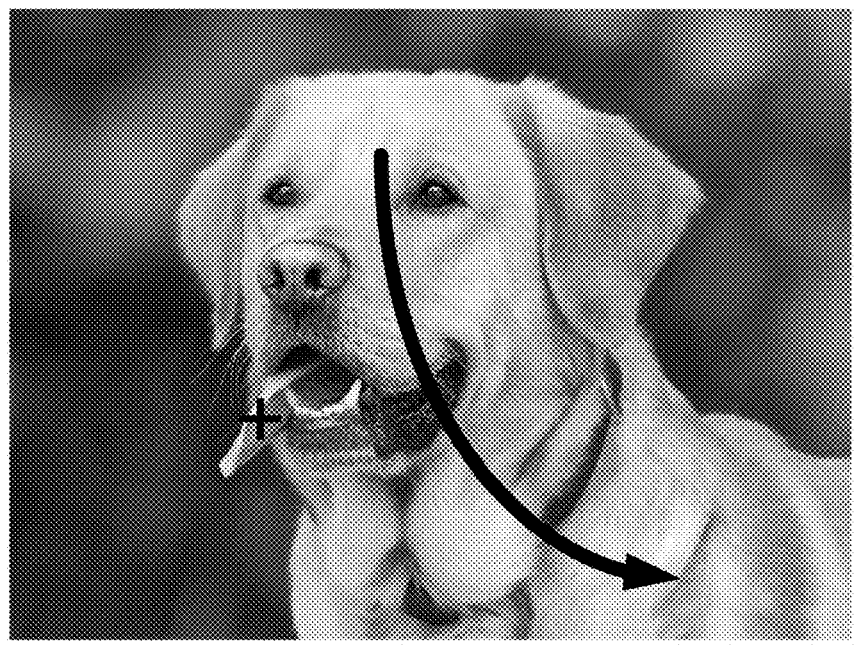

FIG. 6 illustrates user input for foreground/background marking of an image, in accordance with an embodiment of the present disclosure. The interactive image matting process, as described below, operates on user provided input to designate the foreground (or optionally, the background) regions of the input image 110. In this example, three mouse clicks 610, shown as cross marks, are sufficient to indicate that the dog is the foreground object of interest. In this case, one of the mouse clicks is used to designate the dog's tongue as part of the foreground image. In other cases, just one or two mouse clicks may be sufficient for the disclosed techniques to generate the alpha matte. Alternatively, a swipe gesture 620 (for example, made with a mouse or user's finger or stylus), indicated by the arrow, may be used to designate the foreground region of the image, either alone or in combination with one or more mouse clicks or finger taps. It will be appreciated that any other convenient methods of user input may also be used to quickly and efficiently designate the foreground region of the image, such as taps, flicks, press-and-holds, and swipes on a touchscreen.

Figure 7:
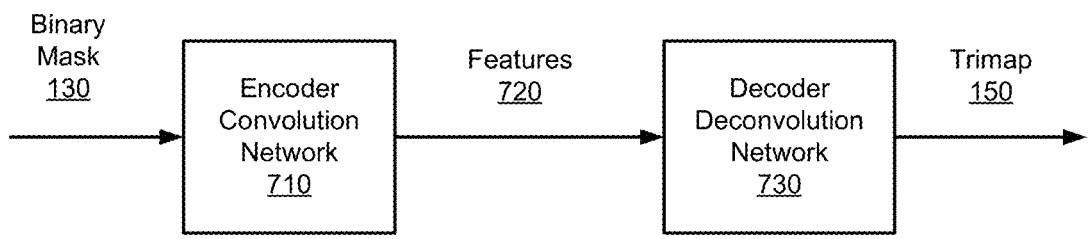
FIG. 7 is a block diagram of a trimap generation deep neural network (DNN), configured in accordance with an embodiment of the present disclosure.

FIG. 7 is a block diagram of the trimap generation DNN subnetwork 140, as shown in FIG. 1, configured in accordance with an embodiment of the present disclosure. The trimap generation DNN subnetwork 140 is shown to include a multilayer encoder convolutional network 710 configured to transform a binary mask 130 (as shown, for example, in FIG. 3) into a set of image feature vectors 720. The trimap generation DNN subnetwork 140 is also shown to include a decoder deconvolutional network 730, configured to transform the feature vectors 720 into a trimap 150 (an example of which is also shown in FIG. 3). In some embodiments, the trimap generation DNN subnetwork is implemented as a ResNet neural network or a VGG16 neural network, although other such commercially available neural networks may be used, in light of the present disclosure. Although the encoder convolutional network 710 and decoder deconvolutional network 730 may employ standard NN architectures (which include, for example, convolutional layers, max pooling layers, activation functions, deconvolutional layers, and unpooling layers), the networks 710 and 730 are configured to generate a trimap for novel use in the generation of an alpha matte, through a training process that will be described below, in connection with FIG. 8.

As previously described, in some embodiments, the uncertain status region 330 of the trimap may comprise a range of values, for example between 0 and 255 where lower values indicate a greater likelihood of background and higher values indicate a greater likelihood of foreground. Although this range of values indicates that the region is unknown (for example, not definitively foreground or background), the values can provide an indication to the follow-on alpha matte generation DNN 160, that the region is more likely foreground or more likely background. This additional information can improve the performance of the alpha matte generation DNN 160.

Figure 8:
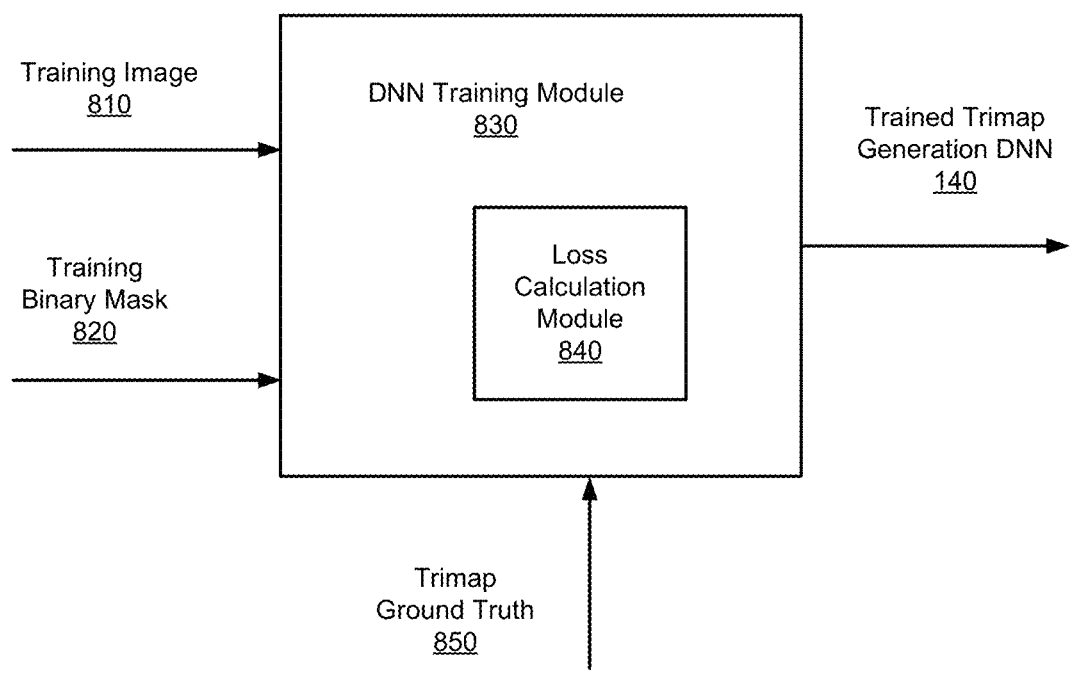
FIG. 8 is a block diagram illustrating training of a trimap generation DNN, configured in accordance with an embodiment of the present disclosure.

FIG. 8 is a block diagram illustrating training 800 of the trimap generation DNN subnetwork 140, configured in accordance with an embodiment of the present disclosure. A DNN training module 830 is configured to perform an iterative training process on the trimap generation DNN subnetwork 140, employing a body of training data that includes training images 810. For each training image 810, a corresponding training binary mask 820 and a corresponding target output trimap 850 (also referred to as trimap ground truth) are provided. The training binary mask 820 and target output trimap 850 may be generated using any suitable method including fine-detailed manual drawing techniques. For each training iteration, the training image 810 and training binary mask 820 are provided to the trimap generation DNN subnetwork being trained, and the network output is compared (for example, on a pixel basis) to the target output trimap 850.

The loss calculation module 840 is configured to minimize a loss function based on the comparison. In some embodiments, the loss function may be based on a sum of absolute differences or a mean squared error measurement between the pixel being compared. The loss function represents the error in the network trimap output and is used to update the network weights for that iteration such that the network learns to improve. The training process continues with multiple such iterations and multiple sets of training data (for example, images 810, binary masks 820, and target outputs 850) until the network performance reaches a desired level of accuracy, at which point a trained trimap generation DNN results.

In some embodiments, the binary mask generation DNN subnetwork 120 and the alpha matte generation DNN subnetwork 160 may similarly be implemented as multilayer encoder and decoder convolutional/deconvolutional networks, using ResNet, VGG16, or other suitable neural networks. These subnetworks 120 and 160 may also be trained using training data and corresponding truth data according to known techniques in light of the present disclosure.

When the alpha matte 170 is used to generate a new image composition (as illustrated for example in FIG. 5, where the foreground object is extracted from the existing background and placed against a new background), undesirable halo or fringe effects can sometimes result, particularly if the new background colors are different from the old background colors. To deal with this problem, in some embodiments, the alpha matte generation DNN subnetwork 160 is also configured (for example, trained) to generate foreground and/or background (FG/BG) color decontamination maps 180. The foreground color decontamination map provides foreground color channels (for example, red-green-blue or RGB channels) associated with pixels of the alpha matte and the background color decontamination map provides background color channels associated with the pixels of the alpha matte. The color decontamination maps are useful to reduce or prevent halos. For example, if a yellow object is next to a blue object, the colors of edge pixels that are covering both the yellow and blue regions will blend together producing a shade of green. If the yellow object is then moved onto a white background, the resulting green fringe around the yellow object is undesirable. The color decontamination maps enable image processing tools to determine that, for those pixels, the foreground color was actually yellow, and therefore the green fringe can be removed. Said differently, while the alpha matte provides information that, for example, a pixel is 30% foreground, it is also useful to know what color the foreground was, and this can be provided by the FG color decontamination map. The same principle applies for the BG color decontamination map.

Figure 9:
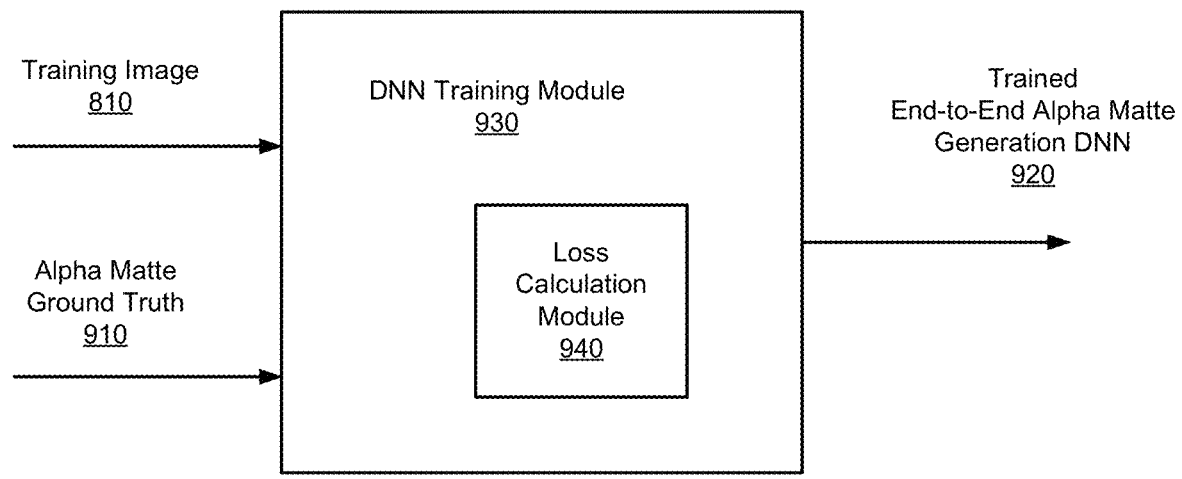
FIG. 9 is a block diagram illustrating training of an end-to-end alpha mate generation DNN, configured in accordance with an embodiment of the present disclosure.

FIG. 9 is a block diagram illustrating training 900 of an end-to-end alpha matte generation DNN 920, configured in accordance with an embodiment of the present disclosure. In some embodiments, the three DNN subnetworks (binary mask generation 120, trimap generation 140, and alpha matte generation 160) may be treated or lumped together as a single end-to-end alpha matte generation DNN 920. As such, a DNN training module 930 may be configured to perform an iterative training process on the end-to-end alpha matte generation DNN 920, based on training images 810, and associated target alpha matte 910 (also referred to as alpha matte ground truth. The loss calculation module 940 is configured to minimize a loss function based on a comparison (for example, on a pixel basis) of alpha matte ground truth data 910 to the output of the end-to-end alpha matte generation DNN being trained, at each iteration. In some embodiments, the comparison may employ a sum of absolute differences or a mean squared error measurement.

In some embodiments, the loss calculation module 940 is configured to minimize a loss function based on a comparison of gradients (for example, edges) between the output (at each training iteration) of the end-to-end alpha matte generation DNN being trained, with gradients in background regions of the training image 810. The motivation for this approach is that if an edge in the generated alpha matte, at a training iteration, aligns with an edge in the background region of the training image, then that is more likely to be an error. For example, first consider the whiskers of the dog in input image 110 which are correctly represented in the generated alpha matte 170. If, however, input image 110 was used as a training image, and alpha matte 170 was generated during a training iteration, then that whisker (that is, edge/gradient feature) might indicate an error, if there existed a similar edge feature in the background region of the image that aligned with what was thought to be the whisker. Said differently, the loss function based on a comparison of gradients can be useful to reduce the chances, for example, of a strand of hair or fur from remaining in a blue-sky background.

In some embodiments, the end-to-end alpha matte generation DNN is implemented as a ResNet neural network or a VGG16 neural network, although other suitable networks may be used.

Figure 10:
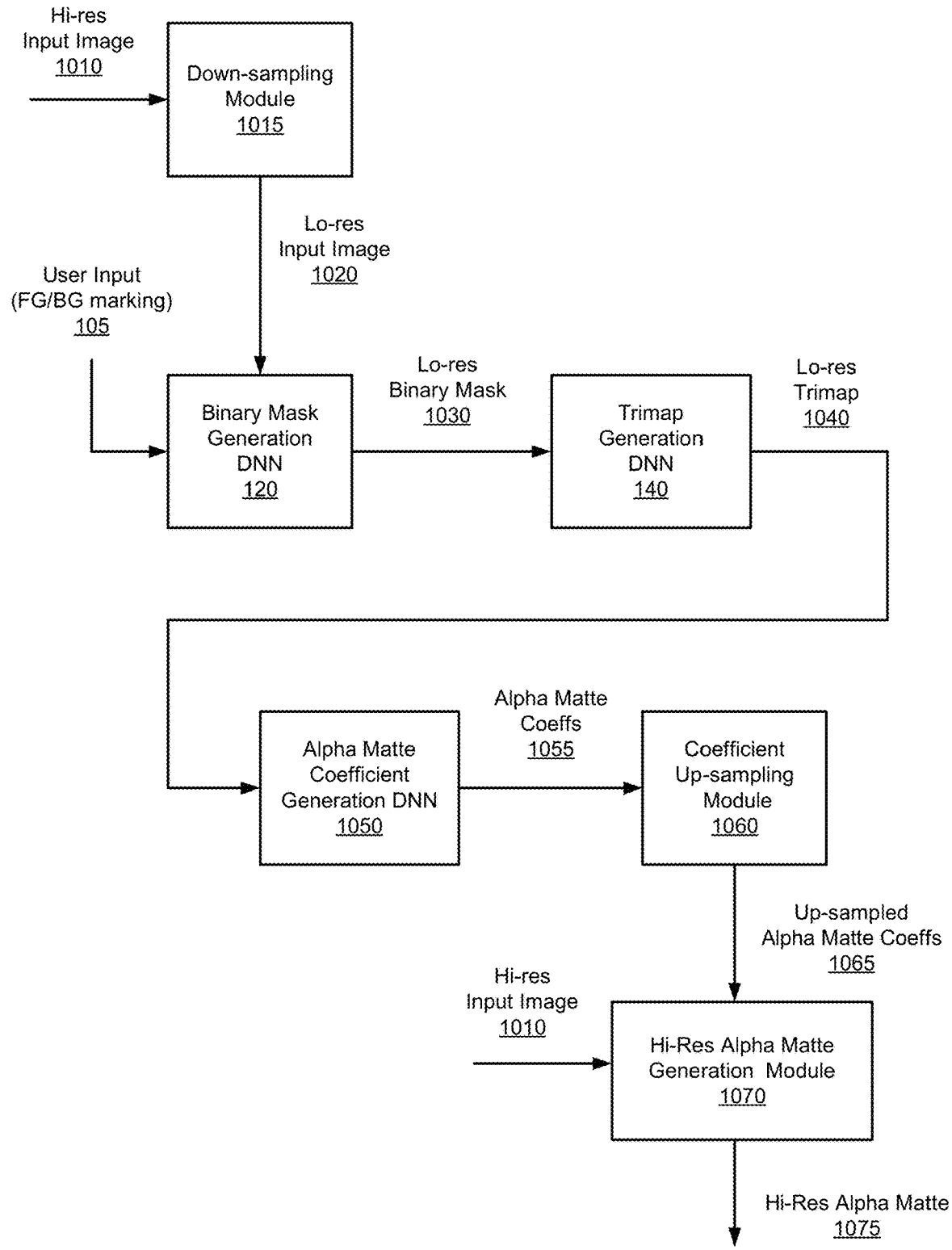
FIG. 10 is a block diagram of a hi-resolution image matting system, configured in accordance with an embodiment of the present disclosure.

FIG. 10 is a block diagram of a hi-resolution image matting system 1000, configured in accordance with an embodiment of the present disclosure. The hi-resolution image matting system 1000 is shown to include a down-sampling module 1015, binary mask generation DNN subnetwork 1030, trimap generation DNN subnetwork 140, an alpha matte coefficient generation DNN subnetwork 1050, a coefficient up-sampling module 1060, and a high-resolution alpha matte generation module 1070. The hi-resolution image matting system 1000 is configured to reduce the computational workload and improve performance efficiency by operating on a down-sampled, reduced resolution version of the image, and then reconstructing a high-resolution version of the resulting alpha matte, as will be explained below.

The down-sampling module 1015 is configured to down-sample an input image 1010 from a first relatively high resolution to a second lower resolution image 1020. The binary mask generation DNN subnetwork 120 is configured to generate a low resolution binary mask 1030 from the lower resolution input image 1020, based on user input foreground/background markings 105.

The trimap generation DNN subnetwork 140 is configured to generate a low resolution trimap 1040 from the lower resolution binary mask 1030.

The alpha matte coefficient generation DNN subnetwork 1050 is configured to generate coefficients that are representative of an alpha matte associated with the lower resolution image 1020. The coefficients are affine parameters that may be used to linearly combine or map colors of the image to generate an alpha matte. Affine parameters have the property that points, straight lines, and planes are preserved during a transformation based on the linear combination using those parameters as coefficients.

The coefficient up-sampling module 1060 is configured to up-sample the alpha matte coefficients 1055 from the second lower resolution back to the first higher resolution.

The high-resolution alpha matte generation module 1070 is configured to generate the high resolution alpha matte 1075 as a linear combination of colors of the higher resolution input image 1010 using the affine parameter coefficients of the up-sampled alpha matte coefficients 1065. In some embodiments, the linear combination may be expressed by the following equation:

$$\text{alpha}(i) = R(i)a_1(i) + G(i)a_2(i) + B(i)a_3(i) + a_4(i)$$

where alpha(i) is the calculated value of the high-resolution alpha matte at pixel i, R(i) is the value of the red color channel of the high-resolution input image 1010 at pixel i, G(i) is the value of the green color channel of the high-resolution input image at pixel i, B(i) is the value of the blue color channel of the high-resolution input image at pixel i, and $a_1(i)$ through $a_4(i)$ are the affine parameter coefficients associated with pixel i.

In some embodiments, more complex linear combinations may be used, such as, for example:

$$\text{alpha}(i) = R(i)^2 a_1(i) + G(i)^2 a_2(i) + B(i)^2 a_3(i) + R(i)G(i)a_4(i) + B(i)G(i)a_5(i) + a_6(i)$$

where $a_1(i)$ through $a_6(i)$ are the affine parameter coefficients associated with pixel i. In still other embodiments, the affine parameters may be expressed as 3×3 matrices to perform spatial convolution (for example, to selectively activate based on the appearance a selected edge structures in the high-resolution image).

Methodology

Figure 11:
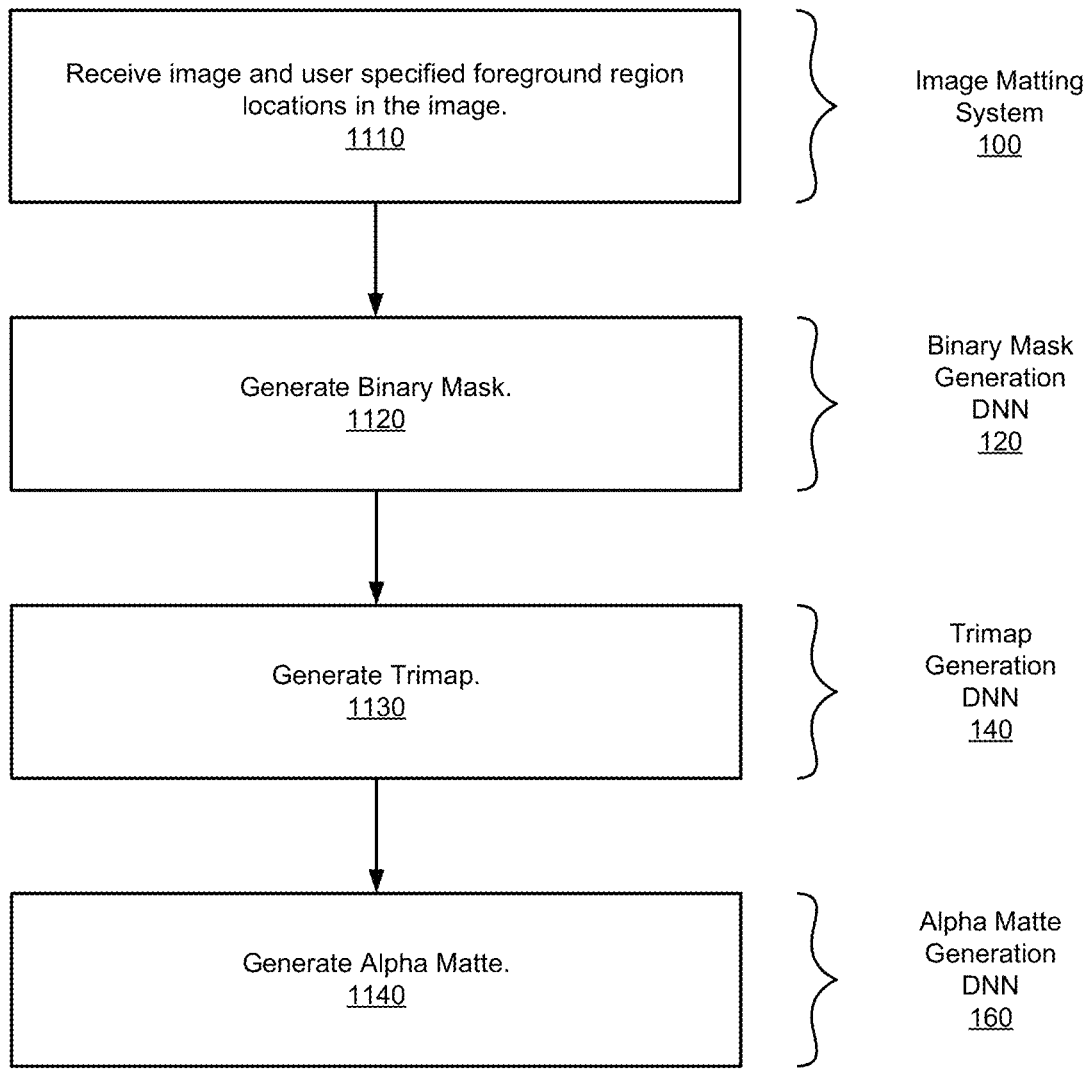
FIG. 11 is a flowchart illustrating a method for image matting, in accordance with an embodiment of the present disclosure.

FIG. 11 is a flowchart 1100 illustrating a method for DNN based interactive image matting, in accordance with an embodiment of the present disclosure. As can be seen, the method is described with reference to the configuration of binary mask generation DNN 120, Trimap generation DNN 120, and alpha matte generation DNN 160, of FIG. 1. However, any number of module configurations can be used to implement the method, as will be appreciated in light of this disclosure. Further note that the various functions depicted in the method do not need to be assigned to the specific example modules shown. To this end, the example methodology depicted is provided to give one example embodiment and is not intended to limit the methodology to any particular physical or structural configuration.

The method commences, at operation 1110, by receiving an image to be processed. The image may be provided from a camera on the platform, a database, or any desired source. Additionally, one or more foreground region locations within the image are provided by the user, for example, by a mouse click or a swipe gesture, as previously described.

The method continues, at operation 1120, by applying a first subnetwork of the DNN to the image, the first subnetwork trained to generate a binary mask associated with the image based on the user-specified foreground region locations. The binary mask designates pixels of the image as belonging to either the background or the foreground.

At operation 1130, a second subnetwork of the DNN is applied to the generated binary mask, the second subnetwork trained to generate a trimap associated with the image based on the user-specified foreground region locations. The trimap designates pixels of the image into one of 3 categories: background, foreground, or uncertain status.

At operation 1140, a third subnetwork of the DNN is applied to the generated trimap. The third subnetwork is trained to generate the alpha matte based on the user-specified foreground region locations. The alpha matte comprises pixels which correspond to the pixels of the image but which provide an indication of foreground percentage for each of the image pixels.

In some embodiments, additional operations are performed. For example, in one embodiment, to improve efficiency, the image may be down-sampled to a reduced resolution and the DNN subnetworks may be trained to generate alpha matte affine parameter coefficients at the reduced resolution. The coefficients may then be used to calculate linear combinations of the colors of the image at the original higher resolution to generate the alpha matte at the higher resolution. Additionally, in some embodiments, the DNN is further trained to generate a foreground color decontamination map and/or a background color decontamination map. The foreground color decontamination map provides foreground color channels associated with pixels of the alpha matte and the background color decontamination map provides background color channels associated with the pixels of the alpha matte.

Example Platform

Figure 12:
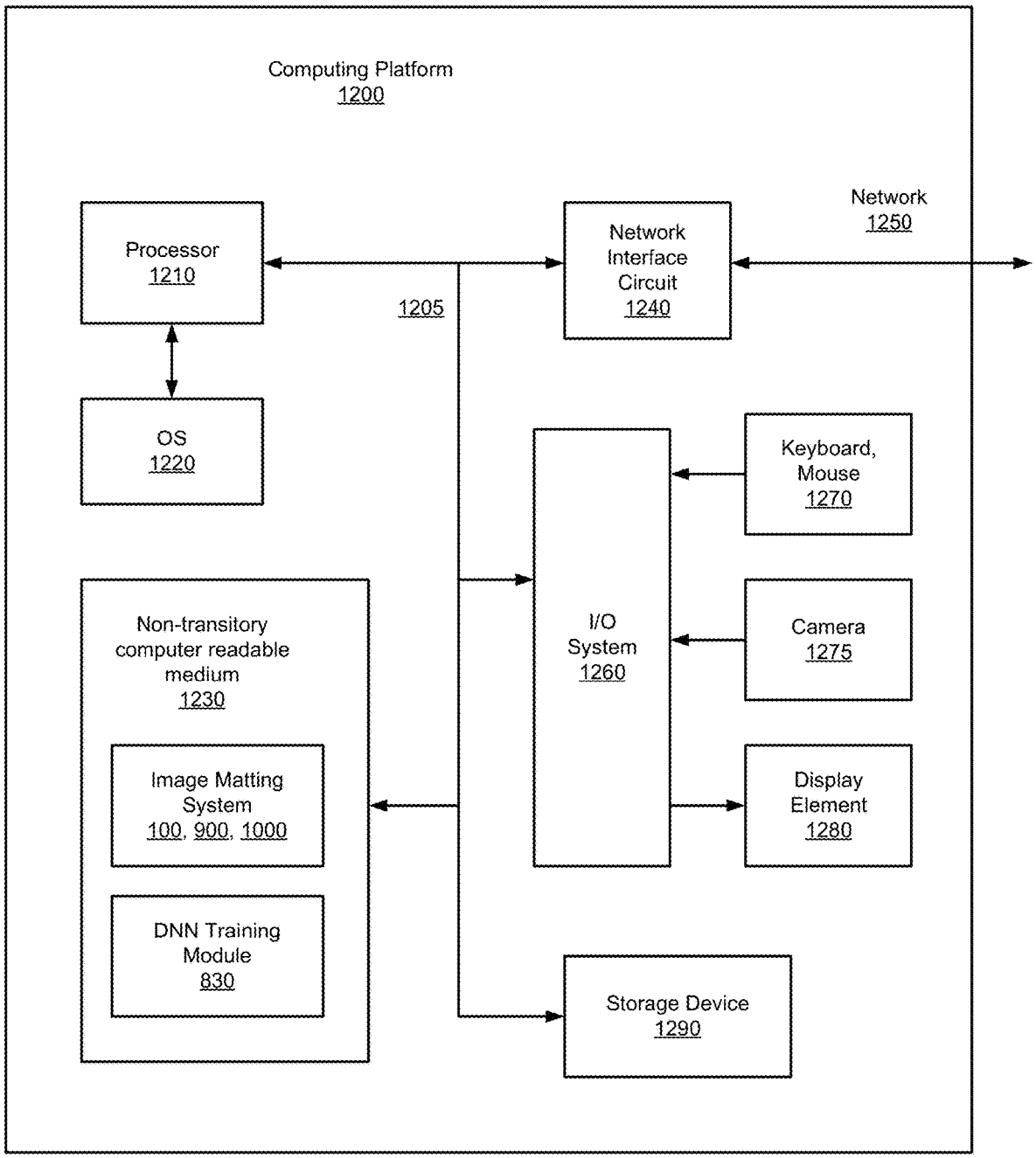
FIG. 12 is a block diagram schematically illustrating a computing platform configured to perform any of the techniques as variously described in this disclosure, configured in accordance with an embodiment of the present disclosure.

FIG. 12 is a block diagram schematically illustrating a computing platform 1200 configured to perform any of the techniques as variously described in this disclosure, configured in accordance with an embodiment of the present disclosure. For example, in some embodiments, the image matting system 100 of FIG. 1, the trimap generation DNN 140 of FIG. 7, the DNN training module 830 of FIG. 8, the end-to-end image matting system 900 of FIG. 9, the hi-resolution image matting system 1000 of FIG. 10, or any portions thereof, and the methodology of FIG. 11, or any portions thereof, are implemented in the computing platform 1200. In some embodiments, the computing platform 1200 is a computer system, such as a workstation, desktop computer, server, laptop, handheld computer, tablet computer (for example, the iPad tablet computer), mobile computing or communication device (for example, the iPhone mobile communication device, the Android mobile communication device, and the like), or other form of computing or telecommunications device that is capable of communication and that has sufficient processor power and memory capacity to perform the operations described in this disclosure. In some embodiments, a distributed computational system is provided comprising a plurality of such computing devices.

The computing platform 1200 includes one or more storage devices 1290 and/or non-transitory computer-readable media 1230 having encoded thereon one or more computer-executable instructions or software for implementing techniques as variously described in this disclosure. In some embodiments, the storage devices 1290 include a computer system memory or random access memory, such as a durable disk storage (for example, any suitable optical or magnetic durable storage device, including RAM, ROM, Flash, USB drive, or other semiconductor-based storage medium), a hard-drive, CD-ROM, or other computer readable media, for storing data and computer-readable instructions and/or software that implement various embodiments as taught in this disclosure. In some embodiments, the storage device 1290 includes other types of memory as well, or combinations thereof. In one embodiment, the storage device 1290 is provided on the computing platform 1200. In another embodiment, the storage device 1290 is provided separately or remotely from the computing platform 1200. The non-transitory computer-readable media 1230 include, but are not limited to, one or more types of hardware memory, non-transitory tangible media (for example, one or more magnetic storage disks, one or more optical disks, one or more USB flash drives), and the like. In some embodiments, the non-transitory computer-readable media 1230 included in the computing platform 1200 store computer-readable and computer-executable instructions or software for implementing various embodiments. In one embodiment, the computer-readable media 1230 are provided on the computing platform 1200. In another embodiment, the computer-readable media 1230 are provided separately or remotely from the computing platform 1200.

The computing platform 1200 also includes at least one processor 1210 for executing computer-readable and computer-executable instructions or software stored in the storage device 1290 and/or non-transitory computer-readable media 1230 and other programs for controlling system hardware. In some embodiments, virtualization is employed in the computing platform 1200 so that infrastructure and resources in the computing platform 1200 are shared dynamically. For example, a virtual machine is provided to handle a process running on multiple processors so that the process appears to be using only one computing resource rather than multiple computing resources. In some embodiments, multiple virtual machines are used with one processor.

As can be further seen, a bus or interconnect 1205 is also provided to allow for communication between the various components listed above and/or other components not shown. Computing platform 1200 can be coupled to a network 1250 (for example, a local or wide area network such as the internet), through network interface circuit 1240 to allow for communications with other computing devices, platforms, resources, clients, and Internet of Things (IoT) devices.

In some embodiments, a user interacts with the computing platform 1200 through an input/output system 1260 that interfaces with devices such as a keyboard and mouse 1270, a camera 1275, and/or a display element (screen/monitor) 1280. The keyboard and mouse may be configured to provide a user interface to accept user input and guidance, for example to indicate foreground and background regions of an image and to otherwise control image processing applications/tools. The camera may be configured, for example, to provide images for processing using the disclosed techniques. The display element may be configured, for example, to display the image before, during and after processing using the disclosed techniques. In some embodiments, the computing platform 1200 includes other I/O devices (not shown) for receiving input from a user, for example, a pointing device or a touchpad, etc., or any suitable user interface. In some embodiments, the computing platform 1200 includes other suitable conventional I/O peripherals. The computing platform 1200 can include and/or be operatively coupled to various suitable devices for performing one or more of the aspects as variously described in this disclosure.

In some embodiments, the computing platform 1200 runs an operating system (OS) 1220, such as any of the versions of Microsoft Windows operating systems, the different releases of the Unix and Linux operating systems, any version of the MacOS for Macintosh computers, any embedded operating system, any real-time operating system, any open source operating system, any proprietary operating system, any operating systems for mobile computing devices, or any other operating system capable of running on the computing platform 1200 and performing the operations described in this disclosure. In one embodiment, the operating system runs on one or more cloud machine instances.

As will be appreciated in light of this disclosure, the various modules and components of the system, as shown in FIGS. 1 and 7-10, can be implemented in software, such as a set of instructions (for example, HTML, XML, C, C++, object-oriented C, JavaScript, Java, BASIC, etc.) encoded on any computer readable medium or computer program product (for example, hard drive, server, disc, or other suitable non-transient memory or set of memories), that when executed by one or more processors, cause the various methodologies provided in this disclosure to be carried out. It will be appreciated that, in some embodiments, various functions and data transformations performed by the computing system, as described in this disclosure, can be performed by similar processors in different configurations and arrangements, and that the depicted embodiments are not intended to be limiting. Various components of this example embodiment, including the computing platform 1200, can be integrated into, for example, one or more desktop or laptop computers, workstations, tablets, smart phones, game consoles, set-top boxes, or other such computing devices. Other componentry and modules typical of a computing system, such as, for example a co-processor, a processing core, a graphics processing unit, a touch pad, a touch screen, etc., are not shown but will be readily apparent.

In other embodiments, the functional components/modules are implemented with hardware, such as gate level logic (for example, FPGA) or a purpose-built semiconductor (for example, ASIC). Still other embodiments are implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

Further Example Embodiments

Numerous example embodiments will be apparent, and features described herein can be combined in any number of configurations.

Example 1 includes a method for image matting, the method comprising: generating, by a processor-based deep neural network (DNN), an alpha matte associated with an image, the generation based on a user-specified foreground region location in the image, wherein the generating includes generating a binary mask associated with the image based on the user-specified foreground region location, the image comprising image pixels, the binary mask designating the image pixels as at least one of background and foreground; generate a trimap associated with the image based on the generated binary mask and the user-specified foreground region location, the trimap designating the image pixels as at least one of background, foreground, or uncertain status; and generate the alpha matte based on the generated trimap and the user-specified foreground region location.

Example 2 includes the subject matter of Example 1, wherein the alpha matte comprises alpha matte pixels, the alpha matte pixels corresponding to the image pixels and providing an indication of foreground percentage for the corresponding image pixels.

Example 3 includes the subject matter of Examples 1 or 2, wherein training of the DNN includes minimization of a loss function based on a comparison of the alpha matte pixels generated from a training image and ground truth alpha matte pixels associated with the training image.

Example 4 includes the subject matter of any of Examples 1 through 3, wherein training of the DNN includes minimization of a loss function based on a comparison of gradients of the alpha matte generated from a training image and gradients in background regions of the training image.

Example 5 includes the subject matter of any of Examples 1 through 4, wherein the alpha matte is a first alpha matte, the method further comprising: performing down-sampling of the image from a first resolution to a second resolution prior to generating the binary mask, wherein the first resolution is higher than the second resolution; performing up-sampling of the first alpha matte from the second resolution to the first resolution, wherein the first alpha matte comprises affine parameter coefficients associated with the image pixels; and generating a second alpha matte as a linear combination of colors of the image at the first resolution, the linear combination employing the affine parameter coefficients of the first alpha matte.

Example 6 includes the subject matter of any of Examples 1 through 5, wherein the DNN is further configured to generate a foreground color decontamination map and/or a background color decontamination map, the foreground color decontamination map providing foreground color channels associated with the alpha matte pixels, and the background color decontamination map providing background color channels associated with the alpha matte pixels.

Example 7 includes the subject matter of any of Examples 1 through 6, wherein the user-specified foreground region location is specified by a mouse-based input or touchscreen-based input.

Example 8 includes the subject matter of any of Examples 1 through 7, wherein the DNN is implemented as a ResNet neural network or a VGG16 neural network.

Example 9 includes a system for image matting, the system comprising: one or more processors to control and/or execute a deep neural network (DNN) configured to generate an alpha matte associated with an image, the image comprising image pixels, the generation based on a user-specified foreground region location in the image, wherein the DNN includes a first subnetwork configured to generate a binary mask associated with the image based on the user-specified foreground region location, the binary mask designating the image pixels as at least one of background and foreground; a second subnetwork configured to generate a trimap associated with the image based on the binary mask and the user-specified foreground region location, the trimap designating the image pixels as at least one of background, foreground, or uncertain status; and a third subnetwork configured to generate the alpha matte based on the trimap and the user-specified foreground region location.

Example 10 includes the subject matter of Example 9, wherein the alpha matte comprises alpha matte pixels, the alpha matte pixels corresponding to the image pixels and providing an indication of foreground percentage for the corresponding image pixels.

Example 11 includes the subject matter of Examples 9 or 10, wherein training of the DNN includes minimization of a loss function based on a comparison of the alpha matte pixels generated from a training image and ground truth alpha matte pixels associated with the training image.

Example 12 includes the subject matter of any of Examples 9 through 11, wherein training of the DNN includes minimization of a loss function based on a comparison of gradients of the alpha matte generated from a training image and gradients in background regions of the training image.

Example 13 includes the subject matter of any of Examples 9 through 12, wherein the alpha matte is a first alpha matte, and the DNN further comprises: the one or more processors further configured to control and/or execute a down-sampling module to down-sample the image from a first resolution to a second resolution prior to operation of the first subnetwork, wherein the first resolution is higher than the second resolution; the one or more processors further configured to control and/or execute a coefficient up-sampling module to up-sample the first alpha matte from the second resolution to the first resolution, wherein the first alpha matte comprises affine parameter coefficients associated with the image pixels; and the one or more processors further configured to control and/or execute a high resolution alpha matte generation module to generate a second alpha matte as a linear combination of colors of the image at the first resolution, the linear combination employing the affine parameter coefficients of the first alpha matte.

Example 14 includes the subject matter of any of Examples 9 through 13, wherein the DNN is further configured to generate a foreground color decontamination map and/or a background color decontamination map, the foreground color decontamination map providing foreground color channels associated with the alpha matte pixels and the background color decontamination map providing background color channels associated with the alpha matte pixels.

Example 15 includes the subject matter of any of Examples 9 through 14, wherein the user-specified foreground region location is specified by mouse-based input or touchscreen-based input.

Example 16 includes the subject matter of any of Examples 9 through 15, wherein the DNN is implemented as a ResNet neural network or a VGG16 neural network.

Example 17 includes a computer program product including one or more non-transitory machine-readable mediums encoded with instructions that when executed by one or more processors cause a process to be carried out for generating a trimap of an image, the process comprising: generating, by a deep neural network (DNN), a trimap associated with an image, the image comprising image pixels, the DNN configured to generate the trimap based on a binary mask associated with the image and on a user-specified foreground region location in the image, the trimap designating the image pixels as at least one of background, foreground, or uncertain status, wherein training of the DNN includes minimization of a loss function based on a comparison of (1) trimap pixels generated from a training image and an associated training binary mask, and (2) ground truth trimap pixels associated with the training image.

Example 18 includes the subject matter of Example 17, wherein the DNN comprises an encoder convolutional network to transform the binary mask to a set of image features and a decoder deconvolutional network to transform the set of image features to the trimap.

Example 19 includes the subject matter of Example 17 or 18, wherein the DNN is implemented as a ResNet neural network or a VGG16 neural network.

Example 20 includes the subject matter of any of Examples 17 through 19, wherein the user-specified foreground region location is specified by mouse-based input or touchscreen-based input.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A method for image matting, the method comprising:
    receiving an image comprising a plurality of image pixels, the image having a foreground region and a background region;
    transforming a binary mask for the image into a set of image feature vectors using a multilayer encoder convolutional network;
    transforming the image feature vectors into a trimap using a decoder deconvolutional network, the trimap designating at least some of the image pixels as at least one of background pixels, foreground pixels, or uncertain status pixels, wherein the decoder deconvolutional network is configured to generate a probability value for a particular one of the uncertain status pixels, the probability value indicating a likelihood that the particular uncertain status pixel belongs to the foreground or the background region of the image; and
    generating, by a deep neural network (DNN), an alpha matte based on the trimap and the probability value.

2. The method of claim 1, wherein the alpha matte comprises alpha matte pixels that correspond to the image pixels and that provide an indication of foreground percentage for the corresponding image pixels.

3. The method of claim 1, wherein the DNN is trained to minimize a loss function based on a comparison of alpha matte pixels generated from a training image and ground truth alpha matte pixels associated with the training image.

4. The method of claim 1, wherein the DNN is trained to minimize a loss function based on a comparison of a gradient of an alpha matte generated from a training image with a gradient in a background region of the training image.

5. The method of claim 1, further comprising:
    down-sampling the image from a high resolution image to a low resolution image;
    using the low resolution image to generate the binary mask; and
    generating affine parameter coefficients based on the trimap;
    wherein generating the alpha matte comprises generating a high resolution alpha matte using a linear combination of colors of the high resolution image and the affine parameter coefficients.

6. The method of claim 1, wherein the DNN is further configured to generate a foreground color decontamination map and a background color decontamination map, the foreground color decontamination map providing foreground color channels associated with pixels of the alpha matte, and the background color decontamination map providing background color channels associated with pixels of the alpha matte.

7. The method of claim 1, wherein a location of the foreground region is specified by pointer-based user input.

8. The method of claim 1, wherein the DNN is implemented as a ResNet neural network.

9. A system for image matting, the system comprising:
    one or more processors to control and/or execute a deep neural network (DNN) configured to generate an alpha matte associated with an image comprising image pixels, wherein the alpha matte is generated based on a user-specified foreground region location in the image, and wherein the DNN includes
        a first subnetwork configured to generate a trimap associated with the image based on (a) a binary mask associated with the image and (b) the user-specified foreground region location, the trimap designating at least some of the image pixels as at least one of background, foreground, or uncertain status; and
        a second subnetwork configured to generate the alpha matte based on the trimap and the user-specified foreground region location;
    wherein the DNN is further configured to generate a color decontamination map that provides color channels associated with pixels of the alpha matte, wherein the color decontamination map is either a foreground color decontamination map that provides foreground color channels, or a background color decontamination map that provides background color channels.

10. The system of claim 9, wherein the DNN is trained to minimize a loss function based on a comparison of alpha matte pixels generated from a training image and ground truth alpha matte pixels associated with the training image.

11. The system of claim 9, wherein the user-specified foreground region location is specified using touchscreen-based input.

12. The system of claim 9, wherein the DNN is implemented as a VGG16 neural network.

13. A computer program product including one or more non-transitory machine-readable mediums encoded with instructions that when executed by one or more processors cause a process to be carried out for generating a trimap of an image, the process comprising:
    displaying a high resolution image comprising image pixels;
    receiving a plurality of user inputs within a foreground region of the displayed high resolution image;
    down-sampling the high resolution image to form a low resolution image;
    using the low resolution image to generate a binary mask;
    generating, by a deep neural network (DNN), a trimap associated with the low resolution image, the DNN configured to generate the trimap based on (a) the binary mask and (b) a location of the foreground region in the high resolution image, the trimap designating at least some of the image pixels as at least one of background, foreground, or uncertain status;

generating affine parameter coefficients based on the trimap; and generating a high resolution alpha matte using a linear combination of colors of the high resolution image and the affine parameter coefficients;

wherein the DNN comprises an encoder convolutional network to transform the binary mask to a set of image features and a decoder deconvolutional network to transform the set of image features to the trimap.

14. The computer program product of claim 13, wherein: the DNN is trained to minimize a loss function based on a comparison of a gradient of an alpha matte generated from a training image with a gradient in a background region of the training image.

15. The computer program product of claim 13, wherein the high resolution alpha matte is generated based on the generated trimap and the location of the foreground region.

16. The computer program product of claim 13, wherein: the DNN is further configured to generate a foreground color decontamination map that provides foreground color channels associated with pixels of the high resolution alpha matte.

17. The computer program product of claim 13, wherein: the DNN is further configured to generate a background color decontamination map that provides background color channels associated with pixels of the high resolution alpha matte.

18. The system of claim 9, wherein the one or more processors are further to control and/or execute an image matting system that:

displays the image on a display device; and receives a plurality of user inputs within a foreground region of the displayed image, the plurality of user inputs defining the user-specified foreground region location in the image.

19. The system of claim 9, wherein:

the first subnetwork is further configured to generate a probability value for a particular one of the uncertain status pixels; and the probability value indicates a likelihood that the particular uncertain status pixel belong to a foreground or a background region of the image.

* * * * *